Aug. 17, 1926.  
C. M. TERRY  
1,596,031  
AUTOMATIC REGULATING MEANS FOR PRESSURE CONTROL  
Filed April 17, 1924  2 Sheets-Sheet 1
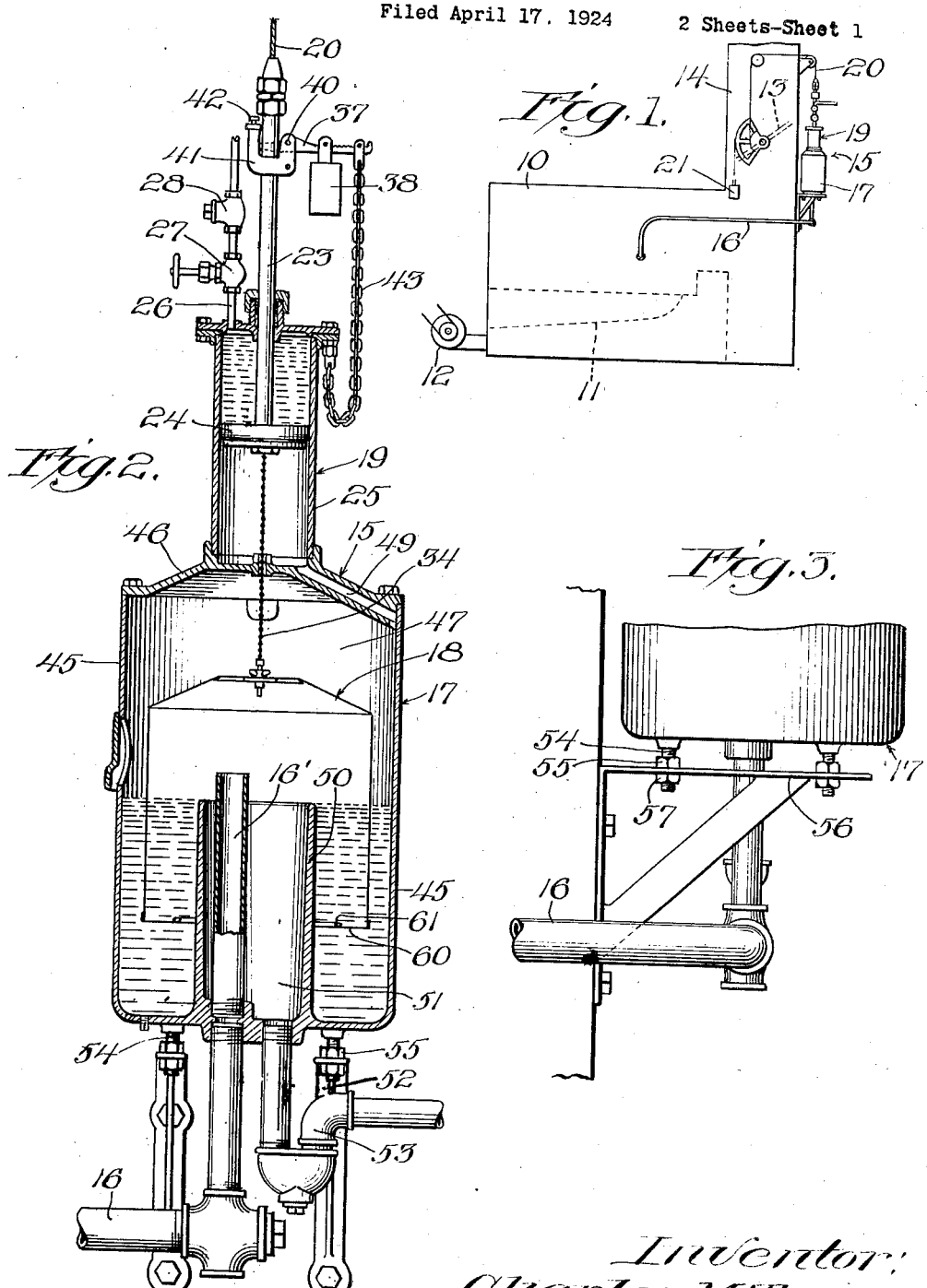
Inventor;  
Charles M. Terry Aug. 17, 1926.  1,596,031
C. M. TERRY
AUTOMATIC REGULATING MEANS FOR PRESSURE CONTROL
Filed April 17, 1924    2 Sheets-Sheet 2
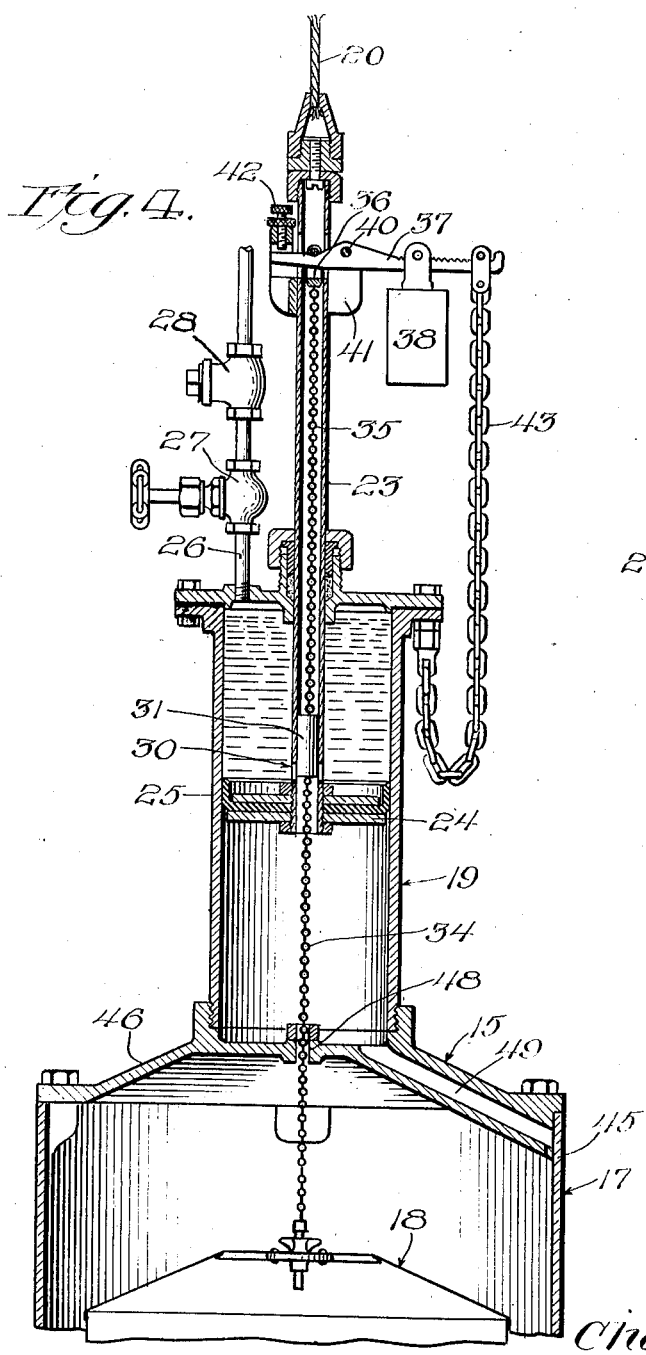
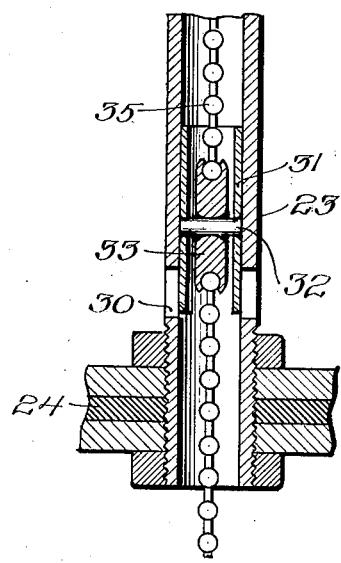
Inventor
Charles M. Terry Patented Aug. 17, 1926.

1,596,031

UNITED STATES PATENT OFFICE.

CHARLES M. TERRY, OF DECATUR, ILLINOIS, ASSIGNOR TO A. W. CASH COMPANY, OF DECATUR, ILLINOIS, A CORPORATION OF DELAWARE.

AUTOMATIC REGULATING MEANS FOR PRESSURE CONTROL.

Application filed April 17, 1924. Serial No. 707,314.

For automatic regulation of the position of one part or adjunct of a steam-boiler furnace equipment (such as a damper, for one specific instance) so that the position of said part may continually be appropriate to the maintenance of substantially uniform pressure condition in a certain area of the equipment (for example, the maintenance of substantially atmospheric pressure in the combustion space of the furnace) it is known practice to employ automatic regulating means comprising a pressure responsive device and a hydraulic motor controlled thereby. In such regulation apparatus the pressure-responsive device has a part movable by pressure change originating in the stated area and the hydraulic motor has a variable-positioned piston maintained under hydraulic pressure on one side only so as to take a position determined by the operation of an outlet valve, such motor outlet valve being operatively connected to the movable part of the pressure-responsive device so that the latter may thus, through the valve, control the position of the motor-piston, and the motor piston being connected with the damper or other part to be regulated so that it may forcefully adjust such part. The general object of my invention is to improve and make more efficient the regulating means of the general character described and to afford at once an improved position-determining motor wherein the piston may take and maintain any position whatever within its limits of travel, and wherein the motor may be controlled by very sensitive yet dependable valve mechanisms; and improved pressure-responsive mechanism suitable for sensitive, prompt yet steady response to pressure changes and most effectively connected with, and particularly adapted to control the motor valve; all in construction giving maximum accuracy, efficiency and dependability in operation; yet rugged, simple, and economical in construction and adapted for ready installation in existing commercial equipment and adjustable to meet varying particular requirements of such installation.

With a view to attaining these objects, and others that will become apparent from the following description, my invention consists in the features of construction and in the combinations and arrangements of parts hereinafter set forth and claimed.

In the drawings, wherein I have illustrated a single embodiment of my invention for purposes of disclosure of one practical utilization thereof, Figure 1 is a diagrammatic view representing a steam-boiler furnace equipment the damper of which is regulated in position by my improved regulator; Fig. 2 is a vertical cross-section through the regulator, with parts in elevation; Fig. 3 is an enlarged detail of an adjustable regulator mounting; Fig. 4 is an enlarged view, with parts broken away, of the upper portion of the structure shown in Fig. 2; and Fig. 5 is an enlarged detail of a fragment of the construction shown in Fig. 4, with the sleeve or engine valve in section.

In the drawings a furnace 10, as diagrammatically shown, is provided with an underfeed stoker 11 to operate as usual under forced draft from a suitable blower 12, and the damper 13 in stack 14 is to be continually adjusted by means of my regulator 15 to tend to maintain uniformity of pressure condition in an appropriate area of the furnace equipment, such as the combustion space above the stoker. A pressure-communicating pipe 16 opens from such combustion space into the pressure responsive device 17 of the regulator, the pressure-movable element 18 whereof (shown as a float) governs the valving operation of the hydraulic motor 19. The motor-piston is operatively connected, as by a cable 20 running over suitable guide pulleys, with the damper 13, and these parts are suitably balanced to tend to move in one direction, as by the provision of a weight 21 operating with constant effect on the damper to press it toward open position.

The damper-cable 20 is connected with the top of the piston rod 23, which is of tubular construction, open at its lower end through the piston 24. Obviously the piston tends constantly to rise to the top of its cylinder 25 under the pull of the damper weight 21, but water or other fluid under pressure flows in a small steady stream into the upper end of the cylinder through a constantly open port from the pipe 26 and the fluid pressure is used to overcome or balance the effect of the damper weight 21. Pipe 26 may, as shown, be provided with a manual valve 27 and a strainer 28. The fluid thus introduced on one side only of the piston, can escape from the cylinder only through valve-controlled ports 30 on the same side of the piston, such ports being made in the hollow piston rod 23 and being controlled by a slide valve 31 mounted within the piston rod. This valve is therefore bodily movable with the piston structure throughout the full range of piston movement, but additionally it is capacitated for a limited range of sliding movement relative to the piston rod thereby to govern the extent of outlet-port opening, and its sliding movement relative to the piston is controlled from the float 18.

Preferably this valve 31 is itself a tube, the lower end portion thereof being adapted to open or close the port-slots 30. A pin 32 extending through the valve affords a receptive bearing for connecting block 33. The bottom of this block is connected, preferably flexibly as by a ball-chain 34, with the float 18. The upper end of the block is preferably connected by a ball chain 35 and stirrup 36 with a valve-opening lever 37 which is weighted as at 38 and constitutes one desirable form of means tending constantly to open the valve in any position of the engine piston. Such lever 37 is shown as pivoted at 40 in a bearing head 41 secured to the piston-rod near the top thereof, one extremity of the lever passing through the hollow piston-rod which is suitably slotted for the purpose and having a range of valve-opening throw which may be limited by an adjusting screw 42 carried by said head 41. Of course the weight 38 would hold the valve fully open at all times, except for the opposing influence of the heavier float-structure 18, the down-pull of which tends to close the valve. The apparent weight of the float 18 will vary as the position of said float changes with respect to its water seal (increasing as the float protrudes more from the water) and to counterbalance automatically this change of effective valve-closing weight, I provide the variable weight 43 to act on lever 37. This weight 43 is shown as a chain which at one end is connected to a fixed point on the motor and at its other end is connected to the weight arm of the lever 37. Both the weight 38 and the weight 43 may be adjusted lengthwise of the weight arm of said lever.

The motor-cylinder 25 is mounted centrally upon the top of the casing or shell of the pressure-responsive device, the base 46 of the motor forming the upper head of the liquid chamber 47 and having a central opening 48 through which the connector-chain 34 passes. The water that escapes from the upper end of the motor is led through a duct 49 in the base 46 into the float-chamber 47.

The hydraulic motor, through the described association of its valve with the float 18, is so sensitive to slight axial movements of the float that accurate maintenance of water level in the float-chamber 47 and avoidance of surging, jumping or "hunting" of the float under change of pressure within the confines of the float is important to the efficient and accurate operation of the damper. Therefore, on the bottom of the shell 45 of the pressure-responsive device I provide a large, high, central over-flow tube or kerb 50, leaving the annular water space relatively deep but narrow, so that the water body is little subject to disturbance from vibration and so that over-flow may take place over a large horizontal lip, the bottom of the well 51 thus provided having a waste pipe 52 provided with a water seal bend 53. The pressure-pipe 16 from the furnace enters the bottom of the shell within the confines of the kerb 50 and effectively extends above the top level of the kerb through a pipe extension 16'. For accuracy of vertical mounting, so as to conserve full benefits of these provisions, and to enable the device to be erected at any desired place on the boiler setting, the bottom of the shell has threaded legs 54 provided with nuts 55 acting as adjustable feet to rest on suitable supporting brackets 56, lock-nuts 57 securing the devices in suitably adjusted position to the bracket. Further to guard against surging and jumping of the float and to make its pressure-responsive movement very smooth and "dead-beat" I provide the inverted-cup-shaped float with a wide, inturned, horizontal marginal flange 60, preferably extending half way or more toward the kerb wall 50, the inner lip of such flange being preferably beaded as at 61.

In operation, the motor stands normally in balanced-pressure condition, with its piston at such point that the ports 30 are just sufficiently opened by valve 31 to permit the steady escape of water, through those ports down through duct 48 into the float chamber 47, precisely equal to the constant in-flow through pipe 26. As long as float 18 maintains a given position this balanced condition will continue. Any rise of pressure in the combustion space, however, is communicated to the interior of the float through pipe 16, and raises the float to some degree. Consequently the valve-opening weight 38, which constantly tends to lift the valve as high as the float 18 will permit it to be raised, rocks the lever 37, and pulls the valve up higher in the piston rod, so opening wider the ports 30. This relieves the water pressure in the top of the motor cylinder and so damper weight 21, constantly tending to open the damper and to pull the motor piston toward the top of its cylinder, does affect these operations to such extent (however minute) as will slide the piston-rod up around the float-restrained valve 31 until the ports 30 are sufficiently throttled to restore the balancing pressure. Should the change of pressure condition within the furnace be a pressure drop, the float sinks to a corresponding extent, dragging down the valve 31, by rocking the lever 37 against the resistance of weights 38 and 43. This momentarily diminishes the effective opening of ports 30, whereupon water pressure promptly builds up in the cylinder to force the piston down until adequate port-opening is again established.

It will be observed that from the production standpoint the construction described involves only a minimum of machine work and that its valving arrangement is particularly simple, while in operation the flexible character of the connection between the float and the valve removes any possibility of the float being distorted or damaged should the valve accidentally become stuck, and the delicate balancing of the valve between the weight of the float and the weights imposed on lever 37 not only gives great sensitiveness to the device but enables automatic compensation to be made through chain 43 or equivalent variable weight provision, for counterbalancing the apparent change of weight of the float and making the linear extent of its response to any given degree of pressure change substantially uniform throughout its range of movement.

It will be understood that while I have herein described in some detail a particular embodiment of my invention for purposes of full disclosure thereof, changes may be made in many particulars without departure from the spirit of my invention and that various features of the invention, although advantageously and interdependently used in the complete regulator, are susceptible of embodiment in other specific mechanisms for their individual advantages.

I claim:—

1. The combination with a part to be moved in response to pressure changes, and a pressure-responsive device, of a hydraulic motor having a piston connected to said part to be moved for governing the position of the latter, said piston having a port, movable with it, and the opening and closing whereof governs piston position, a valve for said port bodily movable with said piston and also movable relative to the piston, thereby to maintain or to change the effective port opening, and operative connections between said valve and said pressure-responsive device for controlling the movements of said valve relative to said piston.

2. The combination with a part to be moved in response to pressure changes, and a pressure-responsive device, of a hydraulic motor having a piston structure operatively connected with said part to be moved and having a port, the opening and closing whereof determines movement of the piston, and a port-governing valve carried by said piston structure for movement therewith and also movement relative thereto to maintain or to vary effective opening or the closing of said port, said valve being operatively connected with the pressure-responsive device, and said motor having a fluid supply connection to one side only of the piston and a fluid-outlet from the other side of said piston.

3. In a regulator of the character described, the combination of a hydraulic motor having a piston-structure carrying a valve, said motor having liquid supply connection to one side only of the piston and a port through said piston structure controlled by said valve, means tending constantly to move said valve in one direction to vary the port opening and a pressure-responsive device having a float operatively connected with said valve and tending by its weight to oppose such first-mentioned valve movement.

4. In a regulating device of the character described, the combination of a pressure-responsive device having a float, a hydraulic motor mounted on said pressure-responsive device and having a piston structure aligning with said float, said motor having liquid-supply connection to one side only of said piston structure and a liquid escape port through said piston structure, a valve carried by said piston structure controlling said escape port and direct axial connection between said valve and said float.

5. In a regulating device of the character described, the combination of a pressure-responsive device having a float, a hydraulic motor mounted on said pressure-responsive device and having a piston structure aligning with said float, said motor having liquid-supply connection to one side only of said piston structure and a liquid escape port through said piston structure, a valve carried by said piston structure controlling said escape port, direct axial connection between said valve and said float, imposing the weight of the float on the valve to move it in one direction, and means carried by said piston structure constantly acting on said valve to tend to move it in opposing direction.

6. In a regulator of the character described, the combination of a hydraulic motor having a piston structure provided with a fluid escape port, means for supplying liquid to one side only of said piston structure, a valve for said escape port carried by said piston structure, a pressure-responsive device having a water sealed float operatively connected with said valve to control its position with respect to the piston structure, and means for automatically compensating for apparent change of weight of said float.

7. In a regulator of the character described, the combination of a hydraulic motor having a piston structure provided with a liquid escape port, means of liquid supply to one side only of the piston structure, a valve carried by said piston structure controlling said escape port, a weight carried by said piston structure operatively associated with said valve and tending to move it in one direction relatively to the piston structure, a pressure-responsive device having a water-sealed float operatively connected with said valve and tending by the float's weight to move said valve in opposite direction in the piston structure, and means for automatically counterbalancing apparent change of weight of the float.

8. In a regulator of the character described, the combination of a pressure-responsive device, a hydraulic motor having a hollow piston provided with a liquid escape port and having means for supply of liquid to one side only of the piston, a valve in said piston-rod controlling said escape port and flexibly connected with said pressure-responsive device, and means for constantly keeping taut said flexible connection.

9. In a regulating device of the character described, the combination of a motor cylinder having liquid inlet connection at one end only, a piston structure therein having a hollow piston rod provided with a liquid escape port to the same end of the cylinder, a slide valve in said piston rod governing said port, a weighted lever carried by said piston rod exteriorly to the cylinder and operatively connected with said valve to tend constantly to move the valve in one direction in the piston rod, and a pressure responsive device having flexible connection with said valve to oppose the first-stated movement of the valve.

10. In a regulating device of the character described, the combination of a hydraulic motor having a piston structure, means of fluid supply to one side of said piston structure, an outlet port through said piston structure, a valve carried by said piston structure, means carried by said piston structure tending to move said valve toward port-opening position; a pressure-responsive device comprising a casing whereon said motor is axially mounted and enclosing a water seal chamber, a float therein flexibly suspended from said valve, and pressure supply connection leading to the interior of said float.

11. In a regulating device of the character described, the combination of a hydraulic motor having a piston structure, means of fluid supply to one side of said piston structure, an outlet port through said piston structure, a valve carried by said piston structure, means carried by said piston structure tending to move said valve toward port-opening position; a pressure-responsive device comprising a casing whereon said motor is axially mounted and enclosing a water seal chamber, a float therein flexibly suspended from said valve, and pressure supply connection leading to the interior of said float, said seal-chamber having an overflow kerb wall 50 therein, substantially as and for the purpose described.

12. In a regulating device of the character described, the combination of a hydraulic motor having a piston structure, means of fluid supply to one side of said piston structure, an outlet port through said piston structure, a valve carried by said piston structure, means carried by said piston structure tending to move said valve toward port-opening position; a pressure-responsive device comprising a casing whereon said motor is axially mounted and enclosing a water seal chamber, a float therein flexibly suspended from said valve, and pressure supply connection leading to the interior of said float, supporting structure for said pressure-responsive device and adjustable leveling means between said pressure responsive device and said supporting means.

13. In a regulating device of the character described, the combination of a hydraulic motor having a piston structure, means of fluid supply to one side of said piston structure, an outlet port through said piston structure, a valve carried by said piston structure, means carried by said piston structure tending to move said valve toward port-opening position; a pressure-responsive device comprising a casing whereon said motor is axially mounted and enclosing a water seal chamber, a float therein flexibly suspended from said valve, and pressure supply connection leading to the interior of said float, said float having a broad, inturned, substantially horizontal flange, restricting its effective end-opening to less than half of the surface-area of the water within the float.

CHARLES M. TERRY.